July 18, 1961

T. R. THOMAS 2,992,659

HIGH RESTRICTION METERING UNIT

Filed May 20, 1958

INVENTOR
Thomas R. Thomas
BY
Dean Fairbank Hirsch
ATTORNEYS

July 18, 1961 T. R. THOMAS 2,992,659
HIGH RESTRICTION METERING UNIT
Filed May 20, 1958 2 Sheets-Sheet 2
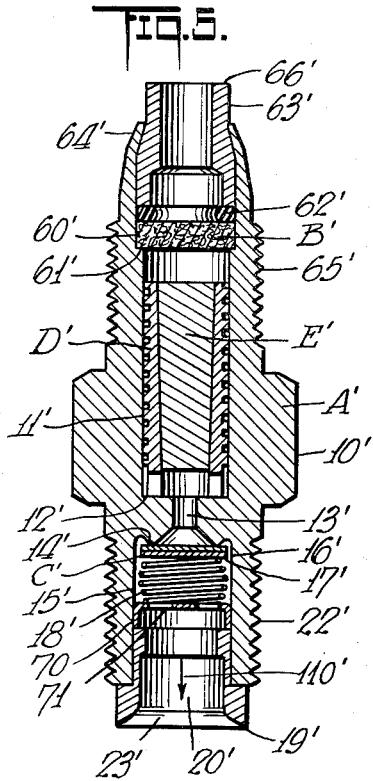
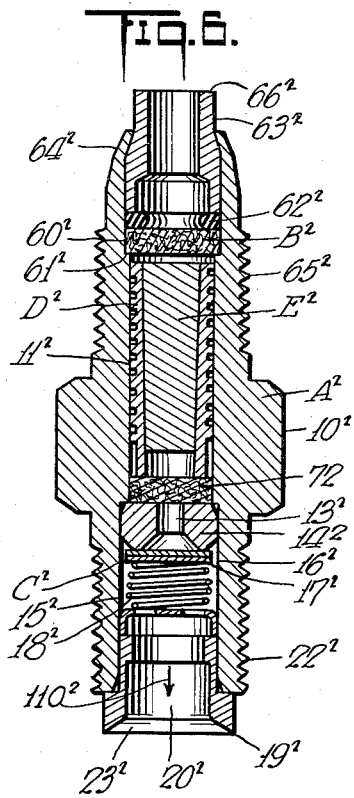
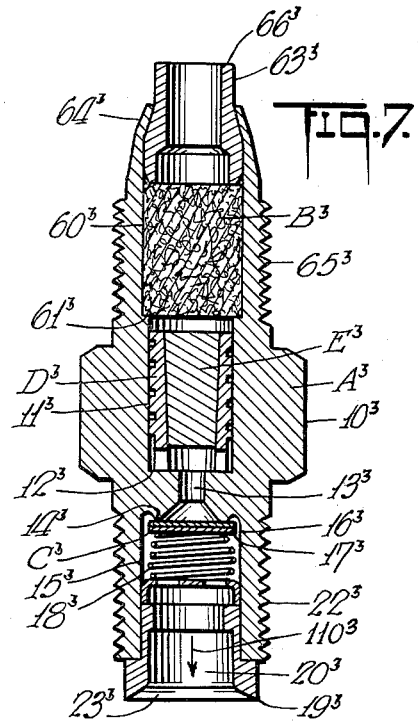
INVENTOR
*Thomas R. Thomas*
BY
*Dean Fairbank & Hirsch*
ATTORNEYS United States Patent Office 2,992,659
Patented July 18, 1961

2,992,659
HIGH RESTRICTION METERING UNIT
Thomas R. Thomas, New York, N.Y., assignor to Auto Research Corporation, Boonton, N.J., a corporation of Delaware
Filed May 20, 1958, Ser. No. 736,505
3 Claims. (Cl. 138—42)

The present invention relates to a lubricant flow meter unit and it particularly relates to a high restriction flow meter unit of the type which will predominantly control the distribution of lubricant through the outlets of a branched distributing lubricating installation.

In connection with automobile chassis, machine tools and various other mechanisms, relatively small quantities of lubricant are to be dispensed to the various bearings during operation of the mechanism without overfeed of lubricant and with assurance there is a proper proportionment of the lubricant which is fed in through a central inlet from a pump or pressure source without undesired variation in feed because of varying distance between the source of pressure and the bearing in question and without regard to the tightness or amount of obstruction encountered at the bearing and without effect because of the varying level or height of one bearing in respect to another bearing.

It has been found necessary that a very high restriction flow meter unit be provided which will have a high restricting effect tremendously greater than encountered in the piping or tubing system or in the bearings, and which will predominantly control the distribution of lubricant regardless of varying lubricant viscosities, climatic conditions, heights of bearings or obstruction in the piping lines.

It is among the principal objects of the present invention to provide a high restriction flow meter unit of the character described which will predominantly control the distribution of lubricant and which may be used as an outlet of a branched distributing piping system.

Another object is to provide a novel lubricant flow meter outlet fitting which may be readily mounted into bearings or used as an outlet connection in tubing systems and which will give a reliable obstructing effect without change due to varying climatic conditions or varying oil viscosity or compositions.

Another object is to provide a high restriction flow metering outlet fitting for use in branched lubricating installations which will reliably give a predetermined proportionment of oil and which may be accordingly rated at a factory, with assurance that its rating will be maintained throughout usage in a lubricating installation even though the fitting be continuously employed over a period of many years.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects it has been found most satisfactory to form the flow metering effect by providing a fitting with a central elongated longitudinal recess or bore having a sleeve with a spiral groove on the periphery thereof, which sleeve will be then positioned in the interior recess or barrel of the fitting and give assurance that the lubricant will be caused to flow through the circuitous passageway to give a very high obstructing effect which quantitatively will be hundreds and thousands times higher than that encountered in the tubing lines or in the bearings.

In a preferred form, a thin tubular shell is placed at the fitting recess and then a plug is pressed in position therein to expand the sleeve and force the sleeve into contact with the interior surface of the recess so that the lubricant will be caused to flow through the spiral passageway from and to the end of the fitting.

Desirably a filter plug is positioned in the inlet end of the fitting while a spring seated disc valve is positioned at the outlet end.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

FIG. 5 is a longitudinal sectional view of an alternative form of fitting similar to FIG. 1 having a spring retainer cup adjacent to the outlet end of the fitting FIG. 6 is a longitudinal sectional view similar to FIGS. 1 and 5 showing a sintered bronze filter unit positioned at both ends of the high restriction passageway.

FIG. 7 is a longitudinal sectional view similar to FIGS. 1, 5 and 6 of still another alternative form of metering fitting with a long inlet felt filter.

Figure 1:
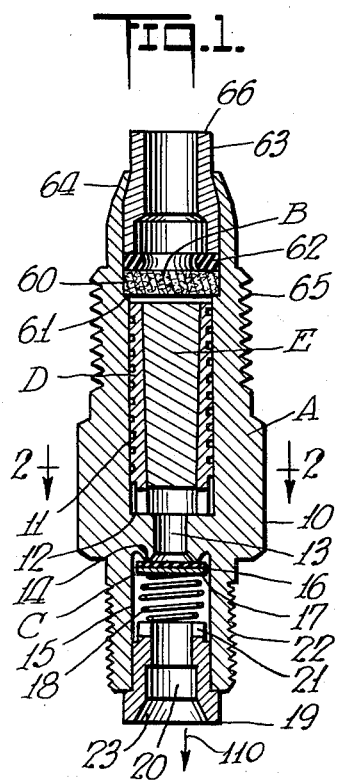
FIG. 1 is a longitudinal sectional view of one form of fitting according to the present invention.
Figure 3:
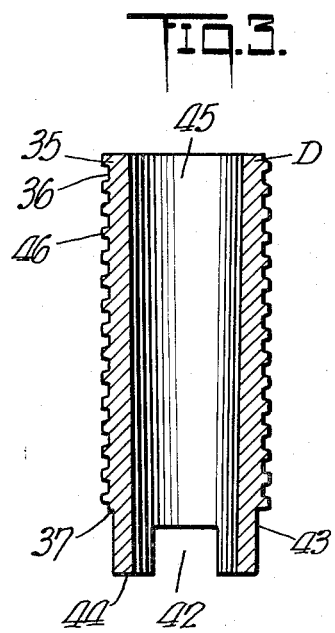
FIG. 3 is a longitudinal sectional view of the spirally grooved sleeve, upon an enlarged scale as compared to FIG. 1, before such sleeve is placed in the fitting.
Figure 4:
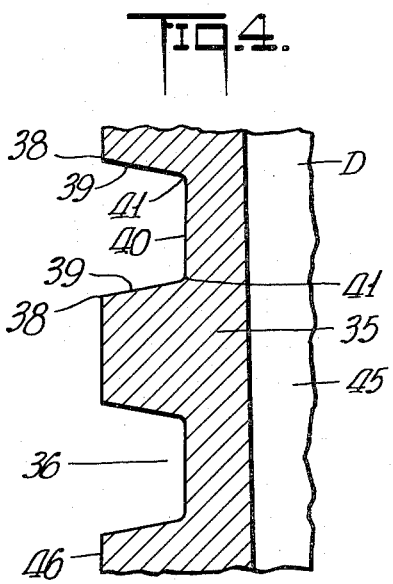
FIG. 4 is an enlarged fragmentary side elevational view showing the form of spiral groove which has been found to be most efficacious in connection with the flow metering fitting of the character described.

Referring to FIG. 1, there is shown a longitudinal fitting with a body A, an inlet filter B, an outlet check valve C and an intermediate restricting device D consisting of a spirally grooved plug, best shown in FIGS. 3 and 4.

This plug D is expanded by the conical insert E after it has been placed in the fitting A. The fitting itself has a hexagonal portion 10, with a central recess of cylindrical shape 11, which extends through the central portion of the body and terminates at the shoulder 12.

Below the shoulder 12 is an outlet flow passage 13 which terminates at the valve seat 14 and opens into the valve outlet chamber 15. The valve C is received in the inside of the valve outlet chamber 15.

The valve C, as shown, may have a facing disc 16 of a vinyl resin or silicon resin or even oilsilk.

The backing plate 17 is usually a disc of the same size, which will strengthen the back of the plastic facing disc 16.

The valve spring 18 will press the face 16 against the seat 14. At its lower end it will react against the insert 19, which is press fitted into the valve chamber 15. This plug has a central flow passage and it has the opposite slots 21 which permit ready flow of lubricant into the flow passage 20. The lubricant will flow out through the passage 20 into a tubing connection, which may be attached by means of the machine thread 22.

The tapered portion 23 may serve to crimp a double tapered coupling sleeve to the outlet tubing connection.

The central recessed portion 11 of the unit A will normally be machined slightly larger than the sleeve D, as shown in FIG. 3. The sleeve D, as shown in FIG. 3, has a thin wall 35 with a thread 36 cut therein, with the thread terminating at the position 37.

The thread desirably has the sharp edges, as indicated at 38, the sloping sides, as indicated at 39, and the flat bottom 40 with the curved bottom edges 41.

The lower portion of the sleeve D, below the thread and at 40, will have the diametrically opposed cross slots 42, which will permit ready flow out of the chamber formed at 43 around the outlet end of the sleeve D.

Figure 2:
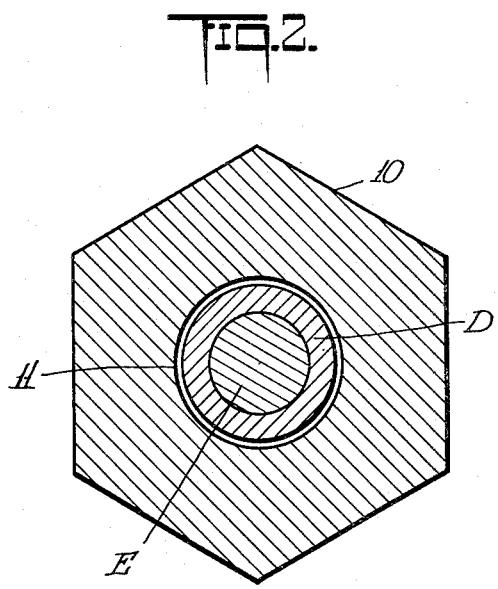
FIG. 2 is a transverse sectional view through the fitting of FIG. 1, upon an enlarged scale as compared to FIG. 1.

The lower edge or face 44 of the sleeve D will normally rest upon the shoulder 12, and after it has been dropped in position in the recess 11, the tapered plug E will be positioned in the opening 45, as shown in FIG. 3, and forced downwardly until the side faces 46 of the threads are pressed against the interior face of the recess 11, with the edges 38 biting into such face a thousandth or two thousandths of an inch in the position as shown in FIGS. 1 and 2.

After the sleeve D has been expanded in position, the valve C may be inserted in the valve chamber 15 and the filter plug 60 may be dropped onto the shoulder 61 in the inlet end of the body A.

On top of the filter is placed the O-rubber ring 62, which is held in position by means of the inlet sleeve 63 and the turned-in portion 64 of the end of the body A.

The threaded portion 65 and the end 66 of the sleeve 63 will permit suitable connection to a junction section of the branched distributing piping system. The threaded portion 65 and the end 66 may be fitted into a tapped hole of a junction box or distributor fitting to permit an oil-tight assembly.

The meter unit shown in FIG. 1 usually has a tailpipe extending from the end thereof in the direction of flow indicated at 110 with the tailpipe extending to the bearing to be lubricated. If desired, the thread at 22 may be a pipe thread instead of a machine thread so that the meter unit may be threaded directly into a bearing housing in which case the opposite threaded end 65 is designed to cooperate with a compression coupling compressor to be attached to the piping or tubing from a central pressure source or pump.

FIGS. 5, 6 and 7 show similar alternative structures as shown in FIG. 1 with similarly functioning parts being indicated by the same letters and numerals except that they are respectively primed, provided with a superior 2 or provided with a superior 3.

FIG. 5 shows a spring retainer 18' with an inverted spring retainer cup 70 with flow openings 71 and a sintered bronze inlet filter B'.

FIG. 6 shows a sintered outlet filter 72 at the exit end of the screw plug $D^2$ with the valve seat $14^2$ being formed as a separate insert positioned in the end of the chamber $15^2$ away from the outlet end of the fitting.

FIG. 7 shows a felt filter $B^3$ in lieu of the sintered filters of FIGS. 1, 5 and 6 at the inlet of the fitting and it shows a shorter threaded restriction plug $D^3$.

It will be noted in FIGS. 1, 5 and 7 that there is a screw driver slot shown at the outlet end of the screw plug in each instance while in FIG. 6 such screw driver slot has been omitted.

The spiral restriction plugs may be elongated as shown in FIGS. 1, 5 and 6, or shortened as shown in FIG. 7, and in all instances the direction of flow is toward the valve at the bottom of each fitting as indicated in FIGS. 1, 5, 6 and 7. Normally the spiral passage may have varying sizes and depths and the depth may vary from .006 to .019 inch with the width of the groove at the bottom varying from .0075 to .0148 inch. The pitch of the thread, that is the distance between successive spirals, may vary from .0179 to .0357 with there being from 56 to 28 threads per inch.

Although the dimensions may be widely varied, it has been found that the fitting may have a dimension of .8 to 1 inch, with an over-all diameter of about .2 to .5 inch. The recess which receives the spirally threaded sleeve may have a dimension of .1 to .2 inch, with a preferred dimension of .16 inch.

The filter plug 60 may be of a sintered metal or ceramic, and the sleeve D, as shown in FIG. 3, before expansion may have a length of about .4 inch, an internal tapered diameter of about .1 inch, with a taper of about 1 to 3 thousandths per inch.

The plug E may be of brass, with a similar taper, and of a length of .36 inch.

Desirably, the material of the plug E should be sufficient that it will expand the sleeve D into tight contact with the interior wall of the recess 11.

Instead of a sintered filter plug 60, it is also possible to use a felt plug, and the O-ring 62 is desirably of a neoprene composition, which will be highly resistant to oil or lubricant. The filter disc 60 should filter out any particle larger than .001 inch.

The unit as shown will obtain proper oil distribution and will give accurate proportionment with pressures in the neighborhood of 20 to 25 pounds per square inch with small size automatic pumps.

The unit as shown may be rated at the factory and will give a reliable flow metering effect when used in the outlet of a branched distributing piping system, regardless of varying oil viscosities, changing climatic conditions and variation in the length of the tubing to each bearing, of the restricting effect in the bearings and of the height of the bearings.

The unit is particularly effective in distributing small minute quantities of lubricant, which must be accurately proportioned in a centralized lubricating installation when lubricant is to be distributed, without overage to relatively small widely scattered bearings in automobile chassis, printing pressures, lathes, looms, ring rails, baking machinery, cutting rolls, reamers, calculating machines, tabulating machines and in general in various types of automatic machinery in which a large number of closely spaced and also widely scattered bearings must necessarily receive relatively minute, yet accurately proportioned, quantities of lubricant throughout the operation.

While there has been herein described a preferred form of the invention, it should be understood that the same may be altered in details and in relative arrangement of parts within the scope of the appended claims.

Having now particularly described and ascertained the nature of the invention, and in what manner the same is to be performed, what is claimed is:

1. For use in a lubricant flow metering high resistance unit of the type having an inlet strainer and an outlet spring seated flat disk check valve with an intermediate cylindrical chamber, a restriction metering element having a sleeve in said chamber with a spiral thread on the outside thereof and a tapered cylindrical opening centrally therethrough and a tapered plug completely fitting said sleeve, the threads of said sleeve biting into the wall of the chamber and preventing flow through said chamber except through said thread.

2. The resistance unit of claim 1, wherein said thread has a cross section with sloping sides converging toward the axis of said restriction metering element, and a bottom side parallel to said axis, said sloping sides and bottom side being joined by a fillet.

3. The resistance unit of claim 1, wherein said sleeve has a reduced diameter extension at one end thereof which is unthreaded, and which has a slot, said slotted end being positioned adjacent said valve.

References Cited in the file of this patent

UNITED STATES PATENTS

| | | |
|---|---|---|
| 869,138 | Emmet | Oct. 22, 1907 |
| 1,684,932 | Weatherhead | Sept. 18, 1928 |
| 1,797,277 | Thomas | Mar. 24, 1931 |
| 1,857,992 | Wilkes | May 10, 1932 |
| 2,061,949 | Monroe | Nov. 24, 1936 |
| 2,185,483 | Ward | Jan. 2, 1940 |
| 2,327,025 | Davis | Aug. 17, 1943 |
| 2,353,734 | Kocher | July 18, 1944 |